Patented July 15, 1952

2,603,599

UNITED STATES PATENT OFFICE 2,603,599

PREVENTION OF FOAMING OF OILS

Charles E. Trautman, Cheswick, Pa., assignor to Gulf Research & Development Company, Pittsburgh, Pa., a corporation of Delaware No Drawing. Application July 11, 1946, Serial No. 682,912

6 Claims. (Cl. 252—33.4)

This invention relates to the prevention of foaming of oils and oil compositions, particularly hydrocarbon and mineral oils and lubricants containing them.

Oils and oil compositions such as hydrocarbon oils and oil compositions containing them tend to foam or froth when agitated in the presence of gases or vapors, such as air, steam, oil vapor, products of combustion, and the like. The amount of foam or froth varies with the conditions under which the oil compositions are agitated, as well as the character of the composition. Under some conditions, the volume of foam or froth produced is many times that of the original oil, and even with mild agitation, substantial amounts of foam are produced in many oil compositions. In preparing and using such oils and oil compositions commercially, they are subjected to agitation under a wide range of conditions and frequently undesirable amounts of foam or froth are produced.

Various means of combating such foaming of oils and oil compositions have been proposed. For instance, mechanical devices have been proposed for destroying or breaking foam as it is formed. Likewise, the incorporation of certain oil-soluble compounds in the oil has been proposed as a means for preventing foaming; such compounds being called "anti-foam agents."

Among the objects achieved by this invention is the provision of an improved method of preventing foaming of oils and oil compositions, particularly hydrocarbon oils and oil compositions containing them, in which the normal foaming tendency of the oil is effectively abated or suppressed for long periods of use without deleteriously affecting the other properties of the oil.

Another object achieved by the present invention is the provision of new and improved anti-foam compositions capable of abating and inhibiting foaming of oils and oil compositions when dispersed therein in minute amounts.

A further object achieved by the present invention is the provision of new and improved oil compositions, particularly improved mineral oils and lubricants, having marked resistance to foaming and other advantageous properties including resistance to emulsification and containing minute amounts of an oil-insoluble anti-foam composition finely dispersed therein.

I have discovered that foaming of oils, particularly mineral oils and compositions containing them, can be effectively suppressed or prevented without substantial modification of the desirable properties of such oils by forming in the oil a stable, fine dispersion of a small amount of an anti-foam composition consisting essentially of a substantially oil-insoluble liquid-polyhydric alcohol and a surface active agent in an amount sufficient to lower the surface tension of said anti-foam composition to a value equal to or preferably less than the surface tension of the oil. I have found that an oil composition containing such an anti-foam composition as a stable, finely dispersed phase is markedly resistant to foaming. The presence of the finely dispersed insoluble liquid phase in the oil apparently causes the films of the oil foam to rupture, thereby quickly destroying the foam. In fact, particularly when an adequate amount of anti-foam composition is used, its presence so rapidly breaks the oil foam that substantially all foam is destroyed as fast as it is formed.

The polyhydric alcohols contemplated for use according to this invention are primarily the dihydric and trihydric alcohols. Typical alcohols which have been found suitable for the purposes of my invention include, for example, ethylene glycol, propylene glycol, trimethylene glycol, dimethylethylene glycol, and glycerol. These alcohols are particularly advantageous for the present purposes because of their insolubility or extremely low solubility in oils, particularly hydrocarbon oils.

The amount of polyhydric alcohol required in accordance with my invention will vary with the tendency of the oil itself to foam, with the particular polyhydric alcohol employed, and with the severity of the conditions to which the oil is subjected. In general, the amount should exceed the saturation solubility of the polyhydric alcohol in the oil and the combined weight of the polyhydric alcohol and the surface active agent is usually between about 0.01 and 2.0 per cent of the weight of the oil, the preferred amount being ordinarily of the order of 0.05 to 1.0 per cent. In some instances where the oil itself does not foam excessively to begin with, such as is the case with some turbine oils, the combined weight of the polyhydric alcohol and the surface active agent may be as little as 0.001 per cent. The quantity of surface active agent varies with the particular polyhydric alcohol employed, as well as with the effectiveness of the surface active agent in lowering the surface tension of the anti-foam composition to a value equal to or less than the surface tension of the oil. In general, the weight ratio of surface active agent to polyhydric alcohol is between about 1 to 1 and 1 to 100. However, in some cases, where the surface active agent is particularly effective, the weight ratio of surface active agent to polyhydric alcohol may be 1 to 1000. In determining the exact amount of the surface active agent to be employed, the amount of agent required to lower the surface tension of the anti-foam composition to a value approximately or advantageously less than the surface tension of the oil is used. For instance, I have found that the surface tension of most hydrocarbon oils is not substantially greater than about 35 dynes per centimeter at room temperature. Accordingly, my preferred anti-foam hydrocarbon oil compositions have surface tensions equal to or less than about 35 dynes per centimeter at room temperature.

By the term "surface active agents" as used herein and in the appended claims I mean to include those materials which when dissolved or dispersed in a polyhydric alcohol have the property of lowering the normal surface tension of the alcohol. Surface active agents may be considered to be divided into four general types: anionic, cationic, non-ionic, and mixed anionic-cationic. Surface active agents suitable for use according to this invention have been found in all four of these types. The classes of surface active agents which may be used in accordance with my invention include, for example, the alkali soaps; soaps of water-soluble amines; sulfonated oils; sulfonated fatty alcohols; sulfosuccinic acid esters; sulfonated amides; salts of long-chain aliphatic amines; partial esters of highly polymerized glycerol; hydroxyalkyl ethers of glycerol, sorbitol or mannitol; esters of long-chain polyethylene glycols; mono-esters of ethylene glycol, propylene glycol, diethylene glycol, triethylene glycol and glycerol with fatty acids; and partial esters of mannide, mannitan, sorbide, sorbitan, and pentaerythritol with fatty acids.

Among the commercially available surface active agents which exemplify some of the above classes of surface active agents and which I have found useful for the purposes of my invention are dioctyl sodium sulfosuccinate, sorbitan monolaurate and diethylene glycol oleate.

In preparing my oil compositions, the oil-insoluble liquid polyhydric alcohol and surface active agent may be incorporated in the oil or oil composition by any suitable method capable of producing a stable fine dispersion of the anti-foam composition in the oil. Various commercial colloid mills and gear pumps have been found suitable for this purpose. Such gear pumps are particularly advantageous in embodiments of this invention wherein fine dispersions of the anti-foam composition are produced in the oil during use. Other methods and apparatus may also be employed in dispersing these agents in oils or oil compositions.

It is sometimes advantageous to first disperse the anti-foam composition in part of the oil and then add this concentrate to the remainder of the oil. Such concentrates can be readily prepared as stable uniform compositions. For instance, a mixture of oil, polyhydric alcohol and surface active agent in the desired proportions may be continuously circulated through a gear pump until a stable concentrate containing a uniform dispersion of the anti-foam composition is obtained. Thus standardized concentrates can be prepared which can be added to lubricating compositions as needed. In such case, the desired amount of concentrate is added to the oil composition, and the mixture is agitated until uniform.

Also, such concentrates are themselves valuable anti-foam compositions. As they contain a preformed, dispersed, insoluble liquid phase, they quickly break oil foams as well as suppress foaming in general. For instance, when added to oil or oil compositions which have foamed, they readily destroy the foam present and stop further foaming. In such cases, they can be quickly blended with oils, oil compositions and crude oil and uniformly incorporated therein before serious foaming occurs.

For such purposes, oil concentrates containing at least 10 per cent of finely dispersed anti-foam composition are advantageous. By adding from 0.01 to 20 per cent of such concentrates to mineral lubricating oils, improved lubricants having marked resistance to foaming are readily and easily obtained.

This invention is effective in the suppression and prevention of foaming in oils and oil compositions generally including fatty oils such as vegetable and animal oils and fatty oil compositions; synthetic oils, by which is meant substances having oil-like properties and synthetically produced from various chemical compounds by condensation, polymerization, hydrogenation, or other such processes; as well as hydrocarbon and mineral oils and compositions containing them. The invention is, however, particularly advantageous in connection with hydrocarbon and mineral oils and oil compositions containing them and is therefore described hereinafter more in detail in connection with its use in the suppression and prevention of foaming in such compositions.

One advantageous field of use for the anti-foam mineral oil compositions of my invention is in lubricants for internal combustion engines, such as automotive, aviation, Diesel and like engines, because I have found that even under the high temperature of operation of these engines, these anti-foam compositions retain their foam-inhibiting properties. In lubricating such engines, appreciable foaming of the motor oil seriously interferes with effective lubrication. For instance, aviation oils (either straight or compounded oils) tend to foam at the low barometric pressures encountered at high altitudes. Also in lubricating such engines, particularly aviation engines, the lubricating oil is circulated under pressure through the parts to be lubricated. In doing so gear pumps are usually employed in supplying pressure oil to the engine and returning the oil from the engine sumps to the reservoir tank. In such systems, the scavenger pump is usually of such capacity as to maintain the engine sump in a substantially dry condition. With such dry sump systems, the scavenger pump frequently pumps large volumes of air with the oil, this air becoming dispersed in the oil. Under such conditions, excessive foam often leads to loss of the oil from the engines and impairs the lubrication. By the present invention, such foaming can be readily overcome or suppressed. For example, an appropriate amount of my anti-foam composition can be introduced into the circulating oil and dispersed therein by the gear pumps, or a concentration of the anti-foam composition can be intermittently injected into the oil and uniformly dispersed therein by such gear pumps whenever substantial amounts of foam appear in the system. Further, such foaming can be prevented and the engine effectively lubricated at all times by employing an improved lubricant containing these anti-foam compositions dispersed therein from the beginning.

My anti-foam compositions, concentrates and improved motor oils are also useful and advantageous in lubricating certain types of engines using splash lubrication. Modern Diesel engine oils usually contain relatively large amounts of additives of the detergent or detergent-dispersion type. These additives include materials such as the oil-soluble salts of metallic or organic bases with various detergent-forming acids. The metallic bases include the alkali metals, Cu, Mg, Ca, Sr, Ba, and the like. The organic bases include primary, secondary, tertiary, and quaternary amines. The detergent-forming acids include fatty acids containing as high as thirty carbon atoms, wool fat acids, petroleum sulfonic acids, sulfuric acid mono-esters, phosphoric acid mono- and di-esters, etc. Many of these detergents promote foaming and produce detergent-containing Diesel lubricating oils which foam badly. By the present invention foaming caused by the addition of detergents to Diesel oils and the like is effectively prevented and improved non-foaming Diesel oils are readily obtained.

Still another field of use for the anti-foam compositions of my invention is in the light oils used in steam turbines. With these light oils, agitation may produce considerable foaming. By the present invention, such foaming of light oils is effectively prevented. Furthermore, there is often a tendency for steam turbine oils to emulsify with the water with which they are mixed. I have found that the anti-foam compositions of my invention do not deleteriously affect the emulsification characteristics of such oils.

A particularly advantageous field of use for the compositions of my invention is in lubricants which are subjected to severe agitation under mild or moderately cool operating temperatures. Examples of such lubricants used at relatively cool temperatures are hydraulic fluids and gear lubricants. Hydraulic fluids are employed for hydraulic power transmissions, presses, lifting devices, and the like. An oil in the power transmission of modern hydraulic equipment is subjected to severe agitation, which may cause considerable foaming with an attendant loss of power. Likewise, gear lubricants, particularly for transmission gears of automotive equipment and the like, are subjected to violent agitation by the rotating gears, and substantial amounts of foam are formed by the air carried beneath the surface of the oil. This foam interferes with the lubrication and cooling of the gears. By the present invention, foaming of hydraulic oils and the accompanying power losses and the foaming of a gear lubricant and its accompanying difficulties are effectively prevented and overcome.

My new anti-foam compositions and concentrates are also useful in other hydrocarbon oils and effectively prevent the foaming thereof. They are useful and advantageous in any oil or oil composition whether used as a lubricant or not, and in which it is desired to prevent foaming. They are particularly effective in combating foaming in mineral lubricating oils and lubricating foaming; however, they are also effective in preventing foaming in oil compositions made up from lighter mineral oil fractions such as mineral seal oil, kerosene, naphtha and the like. These light fractions normally have little or no tendency to foam, however when they are used with various additives the resulting compositions have foaming characteristics which may be overcome with the anti-foam agents of my invention. Such additives when used in mineral lubricating oils also tend to increase the foaming characteristics of such oils, thus making the addition of the anti-foam compositions of my invention to such mixtures more useful. Detergents and their effect on foaming have been mentioned above in connection with Diesel oils. Other "additive" agents include oiliness and extreme pressure agents, such as aromatic chlorine compounds, stabilized chlorinated paraffins, sulfurized fatty oils, and high molecular weight ketones and esters; viscosity index improvers, such as the high molecular weight polymers of isobutylene and the polymers of methacrylic esters; pour point depressants, such as a condensation product of chlorinated wax and naphthalene and a condensation product of chlorinated wax and phenol followed by further condensation of this reaction product with organic acids; and corrosion and oxidation inhibitors, such as 2,6-di-tertiary butyl-4-methyl phenol, triphenyl phosphite, tributyl phosphite, beta naphthol, and phenyl betanaphthylamine. Many of these agents tend to promote foaming and I have found that the anti-foam compositions of my invention will suppress the foaming caused by the addition of such agents to an oil without deleteriously affecting the beneficial characteristics given to the oil by these additives.

The relative effectiveness of various combinations of polyhydric alcohols and surface active agents contemplated for use according to my invention in preventing foaming in different oils and oil compositions may be demonstrated by means of the following foaming test in which the oil or oil composition is controllably aerated under fixed conditions so that the results obtained in a series of tests are directly comparable.

In carrying out this test, 200 cc. of the oil is placed in a tall graduate and air, in the form of fine bubbles, is passed upwardly through this column of oil at a controlled rate of 0.2 cubic feet per hour by means of a diffuser positioned in the bottom of the graduate. The graduate is closed with a suitable cover provided with air inlet and outlet tubes. The inlet tube extends to the bottom of the graduate and has a diffuser fixedly mounted on the lower end. Air is passed down through this tube and through the fine pores of the diffuser into the oil. In this way, uniform fine air bubbles are introduced at the bottom of the oil column. The fine air bubbles pass up through the column of oil agitating it and forming foam. The volume of foam formed at the top of the oil column can be readily and accurately measured on the graduate.

By this test, the time to form a given amount of foam may be noted and recorded and the amount of foam formed in a given time from the start of air flow through the oil may be measured and recorded. Either of these measurements gives a numerical value proportioned to the overall average rate of foaming. One or both of these values can be conveniently used to compare and evaluate the respective foaming properties of different oils and oil compositions.

In the above test, the foaming characteristics of the oil or oil composition tested are usually determined at room temperature under atmospheric pressure. However, if desired, similar foaming tests can be made at other temperatures and pressures as desired. For instance, foaming tests may be made at higher or lower temperatures by placing the graduate containing the oil in a thermostatically controlled bath maintained at the desired temperature. In fact, this is usually done even when the tests are made at room temperatures, the bath and oil in the graduate being brought to a standard temperature, usually 80-90° F., before aerating the oil. The foaming test may be made at reduced pressures by connecting the air outlet of the graduate to a suitable low pressure reservoir maintained at the pressure desired.

In the following specific examples there are illustrated by means of the above foaming test the advantageous results obtained by incorporating in a mineral lubricating oil a mixture of a polyhydric alcohol and a surface active agent according to my invention. In these specific examples ethylene glycol having a surface tension of 49.8 dynes per centimeter at room temperature and glycerol having a surface tension of 65.0 dynes per centimeter at room temperature were used as the polyhydric alcohols. Dioctyl sodium sulfosuccinate and sorbitan mono-laurate were used as the surface active agents in amounts sufficient to lower the surface tension of the anti-foam compositions to values approximately equal to or less than the surface tension of the oil. The mineral lubricating oil employed was a highly refined paraffinic lubricating oil of SAE 50 grade with a surface tension of 34.5 dynes per centimeter at room temperature.

The dioctyl sodium sulfosuccinate used was that grade marketed as 100 per cent dioctyl sodium sulfosuccinate. However, dioctyl sodium sulfosuccinate is available commercially not only as 100 per cent dioctyl sodium sulfosuccinate but also as aqueous solutions containing as high as 90 per cent water to 10 per cent dioctyl sodium sulfosuccinate. In general I have found it most advantageous to use the 100 per cent product and the proportions and percentages recited herein, and the appended claims are based upon 100 per cent dioctyl sodium sulfosuccinate. However, the aqueous solutions may also be used. They have the property of lowering the surface tension of the polyhydric alcohols, and the amount of water thus introduced into the composition is generally so small that it dissolves in the alcohol and does not deleteriously modify the anti-foam properties of the composition. Furthermore, in hot applications, such as in motor lubricants and the like, the water is removed by evaporation in the early stages of use.

The lubricating properties of an improved non-foaming oil composition containing 0.1 per cent of an anti-foam composition consisting of 5 per cent dicotyl sodium sulfosuccinate and 95 per cent glycerol were substantially the same as those of the base oil as shown by the inspection data in the following table.

| Composition | Base Oil | Base Oil Plus 0.1% Anti-Foam Composition |
| --- | --- | --- |
| Gravity, °A. P. I. | 28.9 | 28.9 |
| Viscosity, SUV at: | | |
| 100° F. | 1,175 | 1,182 |
| 210° F. | 101 | 102 |
| Viscosity Index | 102 | 103 |
| Color, N. P. A. | 2½+ | 3− |
| Neutralization No. | 0.03 | 0.01 |

In preparing samples of foam inhibited oils, an anti-foam composition was first prepared by admixing a polyhydric alcohol with a sufficient amount of surface active agent to lower the surface tension of the polyhydric alcohol to a value about equal to or less than the surface tension of the oil employed; that is, to a value not substantially greater than 34.5 dynes per centimeter at room temperature.

The following table shows the surface tension of the oil-insoluble liquid anti-foam compositions which were prepared:

| Composition | Components | | | | Surface tension of Anti-foam Composition at Room Temp. dynes/cm. |
| --- | --- | --- | --- | --- | --- |
| | Surface Active Agent Per Cent by Wt. | | Polyhydric Alcohol Per Cent by Wt. | | |
| | dioctyl sodium sulfosuccinate | sorbitan mono-laurate | Ethylene Glycol | Glycerol | |
| A | 5 | | 95 | | 34.9 |
| B | 25 | | 75 | | 30.6 |
| C | 5 | | | 95 | 29.8 |
| D | 25 | | | 75 | 28.7 |
| E | | 5 | | 95.0 | 29.1 |

The above anti-foam compositions were added in different amounts to separate samples of the above-mentioned S. A. E. 50 oil. The anti-foam composition was dispersed in the oil by continuously circulating the mixture through a gear pump until a fine dispersion of the anti-foam composition was obtained in the oil. To compare the foaming properties of the base oil and the oil containing the above anti-foam compositions, samples (200 cc.) of the treated oils were subjected to the above-described foam test at 78° F. The results were as follows:

| Oils | Volume of Foam After 5 minutes- mls. |
| --- | --- |
| 1. Base oil | 595 |
| 2. Base Oil plus 0.1% Composition A | 250 |
| 3. Base Oil plus 0.1% Composition B | 0 |
| 4. Base Oil plus 1% Composition C | 0 |
| 5. Base Oil plus 1% Composition D | 20 |
| 6. Base Oil plus 0.1% Composition D | 25 |
| 7. Base Oil plus 0.05% Composition D | 0 |
| 8. Base Oil plus 1% Composition E | 0 |

As shown by the above tests, the oil containing the polyhydric alcohols and surface active agents of my invention is effectively rendered non-foaming when the surface tension of the anti-foam composition is not substantially greater than the surface tension of the oil. It can be seen according to oils 3, 4, 5, 6, 7, and 8 that the oil foam breaks so rapidly that even after air bubbles are passed through the columns of oil for 5 minutes there is substantially no foam formed. Composition A, used in the preparation of oil 2, had a surface tension slightly greater than the surface tension of the base oil. Even so, the foaming characteristics of oil 2 are an improvement over the base oil itself.

For comparison another hydrocarbon oil was prepared consisting of 99 per cent base oil and 1 per cent of an anti-foam composition consisting of dioctyl sodium sulfosuccinate and glycerol in a weight ratio of 1 to 999, respectively. The surface tension of the anti-foam composition was 42.4 dynes per centimeter at room temperature. After air had been bubbled through the treated oil composition for 5 minutes, 615 ml. of foam was formed, constituting an actual increase of 20 mls. over the amount of foam formed by the base oil. It is thus observed that the anti-foam compositions of my invention are only effective when the surface tension of the anti-foam composition is not substantially greater than the surface tension of the oil.

In order to illustrate the advantageous results obtained when an anti-foam composition of my invention is added to a light oil, a mineral seal oil and a mineral seal oil containing an antifoam composition of my invention were subjected to the above-described foaming test. The mineral seal oil had a gravity of 40.9° A. P. I., a viscosity of 39.0 S. U. S. at 100° F. and a surface tension of 30.5 dynes per centimeter at room temperature. The anti-foam composition consisted of 90 per cent glycerol and 10 per cent dioctyl sodium sulfosuccinate and had a surface tension of 29.3 dynes per centimeter at room temperature. After the samples were agitated for five minutes at room temperature, the mineral seal oil contained 30 mls. of foam and the mineral seal oil containing the anti-foam composition contained only 5 mls. of foam. From this result it can be noted that the anti-foam compositions of my invention are effective in suppressing the foaming of light oils.

The anti-foam compositions of my invention are also useful in inhibiting the foaming of synthetic oils and fatty oils. For example, a synthetic chemically created oil, when subjected to the above-described foaming test, formed 400 mls. of foam in 5 minutes at room temperature. When 0.5 per cent of an anti-foam composition having a surface tension of 29.3 dynes per cm. at room temperature and consisting of 90 per cent glycerol and 10 per cent dioctyl sodium sulfosuccinate was added to the synthetic oil only 270 mls. of foam formed in 5 minutes.

The following is an example of the advantageous results obtained when an anti-foam composition of my invention is added to a fatty oil: Castor oil, which when uninhibited formed 550 mls. of foam, formed only 20 mls. of foam when it contained 0.5 per cent of the above anti-foam composition having a surface tension of 29.3 dynes per cm. at room temperature.

While my invention has been described above with reference to various specific examples and embodiments, it will be understood that the invention is not limited to such illustrated examples and embodiments and may be variously practiced within the scope of the claims herein made.

I claim as my invention:

1. An oil composition comprising a stable fine dispersion in an oil of an antifoam composition consisting essentially of a polyhydric alcohol having a surface tension greater than the surface tension of the oil and selected from the class consisting of glycols and glycerols and a surface active agent, having the property of lowering the surface tension of said polyhydric alcohol, in an amount sufficient to lower the surface tension of the polyhydric alcohol to a surface tension equal to or less than the surface tension of the oil, said dispersion containing said polyhydric alcohol and said surface active agent in a proportion of 1 to 100 parts by weight of polyhydric alcohol per part by weight of surface active agent, the combined weight of said polyhydric alcohol and said surface active agent being sufficient to decrease the normal foaming tendency of the oil.

2. The composition of claim 1 where the oil is a mineral oil.

3. An oil composition comprising a stable fine dispersion in an oil of an antifoam composition consisting essentially of a polyhydric alcohol having a surface tension greater than the surface tension of the oil and selected from the class consisting of glycols and glycerols and a surface active agent, having the property of lowering the surface tension of said polyhydric alcohol, in an amount sufficient to lower the surface tension of the polyhydric alcohol to a surface tension equal to or less than the surface tension of the oil, said dispersion containing said polyhydric alcohol and said surface active agent in a proportion of 1 to 100 parts by weight of polyhydric alcohol per part by weight of surface active agent, the combined weight of said polyhydric alcohol and said surface active agent corresponding to about 0.001 to 2.0 per cent by weight of the oil.

4. An oil composition comprising a stable fine dispersion in an oil of an antifoam composition consisting essentially of a polyhydric alcohol having a surface tension greater than the surface tension of the oil and selected from the class consisting of glycols and glycerols and dioctyl sodium sulfosuccinate in an amount sufficient to lower the surface tension of the polyhydric alcohol to a surface tension equal to or less than the surface tension of the oil, said dispersion containing said polyhydric alcohol and said dioctyl sodium sulfosuccinate in a proportion of 1 to 100 parts by weight of polyhydric alcohol per part by weight of dioctyl sodium sulfosuccinate, the combined weight of said polyhydric alcohol and said dioctyl sodium sulfosuccinate corresponding to about 0.001 to 2.0 per cent by weight of the oil.

5. The composition of claim 4 where the oil is a mineral oil.

6. An oil composition comprising as table fine dispersion in an oil of an antifoam composition consisting essentially of a polyhydric alcohol having a surface tension greater than the surface tension of the oil and selected from the class consisting of glycols and glycerols and sorbitan monolaurate in an amount sufficient to lower the surface tension of the polyhydric alcohol to a surface tension equal to or less than the surface tension of the oil, said dispersion containing said polyhydric alcohol and said sorbitan monolaurate in a proportion of 1 to 100 parts by weight of polyhydric alcohol per part by weight of sorbitan monolaurate, the combined weight of said polyhydric alcohol and said sorbitan monolaurate corresponding to about 0.001 to 2.0 per cent by weight of the oil.

CHARLES E. TRAUTMAN.

REFERENCES CITED

The following references are of record in the file of this patent:

UNITED STATES PATENTS

| Number | Name | Date |
|---|---|---|
| 1,898,564 | Muench | Feb. 21, 1933 |
| 1,899,610 | Clapsadle | Feb. 28, 1933 |
| 1,988,584 | Dana | Jan. 22, 1935 |
| 2,127,490 | Flaxman | Aug. 16, 1938 |
| 2,145,252 | Engle | Jan. 31, 1939 |
| 2,270,101 | Ballard | Jan. 13, 1942 |
| 2,390,492 | Bennett | Dec. 11, 1945 |
| 2,399,510 | Rocchini | Apr. 30, 1946 |
| 2,430,858 | Borsoff | Nov. 18, 1947 |

OTHER REFERENCES

"Aerosol," American Chem. and Cyanamid Corp., copyright 1941, pp. 13, 14 and 45 pertinent.

"Foaming of Air-Craft Engine Oils as a Problem in Colloid Chemistry," I, McBain et al., Wartime Report of NACA, ARR, No. 4105, pp. 65, 76, 78 and 84.